United States Patent Office 3,230,102
Patented Jan. 18, 1966

3,230,102
REFRACTORY
Eldon D. Miller, Jr., Bridgeville, Pa., assignor to Harbison-Walker Refractories Company, Pittsburgh, Pa., a corporation of Pennsylvania
No Drawing. Filed July 12, 1965, Ser. No. 471,426
5 Claims. (Cl. 106—65)

This invention relates to refractories useful in process equipment for pressure pouring of molten metal. In a particular embodiment, it relates to improved refractory conduits for conducting molten metal from a molten metal containing vessel to a mold. This application is a continuation-in-part of copending application Serial No. 230,277, owned by the same assignee, and now United States Patent No. 3,205,081.

It previously has been proposed to discharge molten metal from a furnace, by applying gas or air under pressure to the surface of the molten metal bath in a furnace chamber or a crucible in a furnace chamber, to force the molten metal through an upwardly extending discharge tube out through an upper portion of the furnace chamber. Previously available refractory conduits, for confining and directing the flow of molten metal from the molten metal-containing vessel or ladle, have been satisfactory to some extent. However, in the attempt to improve various chemical and physical properties in the refractory material, other desirable properties have often been sacrificed. For example, problems of warping, resulting in part from excessive internal glass formation, erosion due to solution of the glassy matrix, susceptibility to cracking and spalling due to poor thermal shock resistance, variation in permeability when subjected to cyclic variation in temperature, have been present either alone or in combination in many previously available refractory conduits.

My copending application Serial No. 230,277 provided an improved refractory conduit having good thermal shock resistance, good erosion resistance, good physical stability, i.e., resists the tendency to warp upon heating, and having little variation in permeability when subjected to cyclic variation in temperature. This was achieved by developing a microscopic structure characterized by relatively coarse high alumina material loosely bonded in a mullite groundmass. The groundmass was characterized by a network of tessellated cracks. While this was a considerable improvement over prior art, refractory conduits, an even greater degree of thermal shock resistance has been sought.

Accordingly, it is an object of this invention to provide an improved refractory conduit having good physical stability, having little variation in permeability when subjected to cyclic variation of temperatures, and having outstanding thermal shock resistance. It is another object of this invention to provide an improved refractory composition for casting of refractory shapes.

The above and other objects and advantages of this invention will be more readily apparent to those skilled in the metallurgical and ceramic arts from a study of the following detailed description. The examples set forth in the following discussion are given by way of explanation and not limitation.

Example I

Example I is according to the teachings of my copending application Serial No. 230,277 in which a refractory batch was prepared of about 80% by weight, calcined South American bauxite, about 10% calcined alumina, about 10% of an air floated ball clay plasticizer, and sufficient tempering fluid as to allow easy flowability for casting (preferably about 8% water added to the batch). In the aforementioned copending application, it is taught that the high alumina refractory material should constitute from 75–85% of the batch. The ball clay and the alumina were substantially all —325 mesh. The bauxite was so size graded as to provide the following typical screen analysis for the total batch: about 55% on a 65 mesh screen with about 25% thereof in the range 3 on 10 mesh. The remaining 45% of the mix passed a 65 mesh screen. About 85% of the —65 mesh fraction passed a 150 mesh screen.

The resulting batch was cast into shapes and burned at cone 15 (2550° F.). The resulting shapes had a modulus of rupture of 1500 p.s.i. and a cold crushing strength of 7940 p.s.i. The permeability of the resulting shapes was about 0.04 cu.in./sec./in.$^2$/in. thickness/lb. air pressure. Upon heating to 2910° F. and cooling, the permeability was 0.05 cu. in./sec./in.$^2$/in. thickness/lb. air pressure. In an ASTM spalling test, the fired shapes were resistant to cracking, indicating good thermal shock resistance.

Lengths of conduit were fabricated of the foregoing refractory mix and were placed in a steel pressure pouring system. They provided a service life twice as long as that of previously used refractory compositions.

Microscopic examination of the fired conduits and shapes, discussed above, indicated internal structure characterized by relatively coarse and large bauxite particles relatively loosely bonded in a mullite groundmass. The groundmass was characterized by a network of tessellated cracks. The network of tessellated cracks appears to provide for stress relief during cyclic variation in temperature.

Additional mixes, according to Example I, were shaped by casting into conduits approximately 6 inches long, with an outside diameter of 6.5 inches and an inside diameter of 3.5 inches. Several conduits each were burned at 2,500, 2250, and 2000° F., with a hold time of 10 hours. These conduits were then subjected to a thermal shock test which is similar to actual service in the pressure pouring process. In this test, the conduits are heated to 1800° F. and then filled with molten metal at 2950° F. After this severe treatment, the conduits are carefully observed for the formation of cracks or other distress. The results of this test are given in the following table:

TABLE I

| Example | Example I | | |
|---|---|---|---|
| Burning Temperature. | 2,500° F | 2,250° F | 2,000° F. |
| Results of Hot Metal Test. | Moderate cracking (at least one crack ⅟₁₆″ wide). | Slight cracking (one hairline crack). | Slight cracking (one hairline crack). |

Table I establishes that conduits should preferably not be burned over 2250° F. and, for best results, should be burned at about 2000° F.

Examples II, III, and IV

While the thermal shock resistance of refractory conduit made according to the teachings of my copending application referred to above was an improvement over the prior art, an even greater improvement was sought. Since it would not be desirable to change the matrix of my copending application, proven to be resistant to corrosion by hot metal, altering the coarse fraction (plus 65 mesh) was considered.

A series of mixes was made in which zircon grog was added in the coarse fraction of the batch of Example I. Zircon was added because it has a thermal conductivity somewhat higher than the bauxite replaced and would be expected to reduce the thermal gradient across the refractory conduit when they are filled with hot metal. This gradient causes differential thermal expansion resulting in tensile stresses at the outer edge of the conduit and compressive stresses on the internal edges. Because oxide refractories are weaker in tension than in compression, the conduit fail by cracks propagating from the outer edges. Zircon was also added because it has a thermal expansion less than the mullite matrix. This is desirable to prevent tensile stresses in the matrix caused by the expansion of coarse particles. These tensile stresses are additive with those caused by the differential expansion.

Examples II, III and IV were fired at 2000° F. for 10 hours and subjected to the hot metal test described above. The compositions of the mixes and the results of the test are given in the table below:

TABLE II

| Example | I (Same as in Table I) percent | II, percent | III, percent | IV, percent |
| --- | --- | --- | --- | --- |
| Mix: | | | | |
| South American Bauxite | 80 | 70 | 60 | 50 |
| Alumina (minus 325 mesh) | 10 | 10 | 10 | 10 |
| Ball Clay | 10 | 10 | 10 | 10 |
| Zircon Grog | | 10 | 20 | 30 |
| Results of Hot Metal Test | [1] Slight | Severe | Severe | [2] Severe |

[1] Only one hairline crack.
[2] At least one crack ⅛ inch wide.

Table II clearly demonstrates that zircon grog cannot be substituted for the coarse fraction of Example I. This is surprising because according to the principles given above, an improvement would be expected. However, the thermal shock resistance of these conduits was very poor.

*Example V*

In Example V silicon carbide was substituted in the coarse fraction of Example I because of its very high thermal conductivity. The mix and the results of the hot metal test are given in the following table:

TABLE III

Example                                                      V
Mix:
  South American bauxite _____percent__ 50
  Alumina (minus 325 mesh) _____do____ 10
  Ball clay _____do____ 10
  Silicon carbide _____do____ 30
Results of the hot metal test _____ No cracking Of all the mixes tested, this mix had the best thermal shock resistance determined by the hot metal test. The silicon carbide reduced the tensile stresses as expected. However, these conduits, containing silicon carbide, were found totally unusable in service. The hot metal readily leached the silicon and carbon from the silicon carbide and was contaminated.

*Examples VI, VII and VIII*

Another series of mixes was made in which amorphous silica was substituted in the coarse fraction of the batch of Example I. These mixes were burned at 2000° F. for 10 hours, and then subjected to the hot metal test described above. The composition of the mixes and the results of the hot metal tests are given below:

TABLE IV

| Example | VI, percent | VII, percent | VIII, percent |
| --- | --- | --- | --- |
| Mix: | | | |
| South American Bauxite | 70 | 60 | 50 |
| Alumina (minus 325 mesh) | 10 | 10 | 10 |
| Ball Clay | 10 | 10 | 10 |
| Amorphous Silica | 10 | 20 | 30 |
| Results of Hot Metal Test | [1] Slight | [2] | [2] |

[1] One hairline crack.
[2] No cracking.

Table IV establishes that the refractory conduit of my copending application is improved by the addition of 10 to 30% amorphous silica added in the coarse fraction of the batch. (Compare Example I with Examples VI, VII and VIII.) This improvement is unexpected because amorphous silica has a very low thermal conductivity which would increase the temperature gradient, the differential thermal expansion across the refractory conduit and the tensile stresses on the outer edges. Possibly, because the amorphous silica does not expand on heat up as much as the surrounding matrix, it develops compressive forces in the matrix which counteract the tensile forces created by the differential thermal expansion described above.

No more than 30% amorphous silica was added to the batch of Example I to prevent touching of amorphous silica grains in the fired conduit. The silica remains isolated by finer bauxite particles and the mullite groundmass. This is desirable because the silica must be kept inaccessible to the hot metal as it is more easily leached than the mullite groundmass. The amorphous silica additions are placed in the coarse fraction also so that the matrix remains characterized by relatively coarse high alumina particles loosely bonded by a mullite groundmass with a network of tessellated cracks.

Amorphous silica is a substantially noncrystalline form of silica that tends to devitrify or recrystallize on heating above about 2000° F. Such instability in a refractory product is generally considered undesirable. For this reason, prior to this invention amorphous silica was not considered a desirable ingredient in refractories if used above its devitrification temperature for a sustained period. While it is not known with certainly what the scientific basis for the successful use of amorphous silica in refractory conduit of this invention above its devitrification temperature is, the following is suggested: No doubt some devitrification occurs during use. However, a cristobalite grain formed from the devitrification of amorphous silica would have to be about 5% smaller than the parent grain, and would be surrounded by a void space. Therefore, there can be no tendency for a devitrified grain of fused silica to apply an expanding force during heating or cooling through the entire range from room temperature to 2950° F.

Furthermore, cristobalite has a reversible thermal expansion which is about as low as amorphous silica and certainly lower than mullite between 1000 and 2900° F. This means that the same advantage will be gained from cristobalite formed in situ as with amorphous silica, particularly in view of the practice in service, which is to keep the conduit above a red heat between successive uses by immediately returning it to a preheating furnace.

Devitrification begins at the surface of amorphous silica grains. Thus, by placing amorphous silica in the mix in a coarse grind which has less surface area than finer grind, the devitrification process is retarded in the practice of this invention.

It would, of course, be impossible to use any other form of silica, such as quartz or cristobalite, in place of the amorphous silica to practice this invention. On heat up, quartz converts to several other crystal forms which are less dense. Thus, these reactions are expansive and would be disruptive in refractory conduits. In summary, cristobalite formed in situ by the devitrification of amorphous silica would not be detrimental only because it is enclosed in a void space.

of the −65 mesh fraction can pass a 150 mesh screen, a workable mix will still be had.

In the foregoing discussion, all parts and percentages are by weight, and all screen sizes are according to the Tyler series. Typical chemical analyses of raw materials usable for the practice of this invention are as follows:

|  | Calcined And Tabular Alumina, Percent | Calcined Burley Diaspore, Percent | Calcined Alabama Bauxite, Percent | Calcined South American Bauxite, Percent | Ball Clay, Percent | Amorphous Silica, Percent |
|---|---|---|---|---|---|---|
| $SiO_2$ | 0.3 | 48.0 | 21.9 | 6.21 | 53.6 | 98.5 |
| $Al_2O_3$ | 99.4 | 47.1 | 74.2 | 88.58 | 30.3 | 0.76 |
| $TiO_2$ |  | 2.4 | 3.4 | 3.37 | 1.7 | 0.03 |
| $Fe_2O_3$ | 0.2 | 1.1 | 0.8 | 1.56 | 0.9 | 0.49 |
| MgO |  | 0.40 | 0.05 |  | 0.49 | 0.18 |
| CaO |  | 0.24 | 0.04 |  |  | 0.04 |
| Alkalies | 0.1 | 0.56 | 0.02 |  | 0.41 | N.D. |
| Ingnition Loss |  |  |  |  | 12.4 |  |

While in the foregoing examples calcined South American bauxite was used, it is to be understood that other high alumina refractory materials may be substituted therefor. For example, one may use calcined diasporitic clays, other calcined bauxitic clays such as calcined Alabama bauxite, calcined tabular alumina, commercially available synthetic high alumina refractory grain, and mixtures thereof. It is essential, however, that the high alumina material selected analyze at least about 50% $Al_2O_3$, by weight and on the basis of an oxide analysis. Also, it should constitute about 45 to 75% of the total weight of the refractory batch. The total high alumina refractory material and amorphous silica should be from 75–85% of the batch. The amorphous silica rests on a 65 mesh screen. The ball clay plasticizer may constitute from 5 to 15% of the total weight of the batch, with the remainder being a high purity, finely divided (−325 mesh), calcined alumina material, such as tabular alumina, with which it reacts upon firing to form mullite. In no event should there be less than about 5%, by weight, of −325 mesh calcined alumina. While all of the plasticizer and at least some calcined alumina should pass a 150 mesh screen, best results are obtained when −325 mesh plasticizer and finely divided alumina are present in equal weight quantities.

The grain sizing of the refractory material for fabricating batches according to this invention is very important. There must be more than 50% of the total batch on a 65 mesh screen. If less than about 50% of the batch rests on a 65 mesh screen, fired shapes made therefrom are characterized by excessive rigidity and lack the desired network of tessellated cracks. Thus, they are susceptible to cracking and spalling when subjected to a cyclic variation in temperature. A workable range for the +65 mesh fraction is about 50 to 70%. It is also necessary that at least about 25%, but no more than about 35%, of the +65 mesh fraction be in the range 3 on 10 mesh. When greater than about 35% of the course +65 mesh fraction is +10 mesh, internal cracking is excessive; and the permeability tends to increase excessively when subjected to cyclic temperature variation. When less than about 25% of this coarser fraction is in the range 3 on 10 mesh, an excessively rigid structure results on firing having the shortcomings discussed above in reference to such rigid structures. One feature of fired refractories of my invention, which I do not fully understand, is that they have low permeability despites the network of tessellated cracks.

As noted above, it is preferred that about 85% of the −65 mesh fraction pass a 150 mesh screen. However, no less than about 70% of the −65 mesh fraction should pass a 150 mesh screen. The upper limit of a workable range for the −150 mesh fraction is dictated by economic considerations. However, in the interest of presenting a complete discription of the invention, upwards of 95%

The amorphous silica used in the examples of this invention was about 95% noncrystalline. However, 85% noncrystalline silica could be used in the practice of this invention.

All chemical analyses are on the basis of an oxide analysis, in conformity with the common practices of reporting the chemical analysis of refractory materials.

The compositions of this invention are particularly adapted to forming refractory shapes according to slip casting techniques. A preferred method of manufacturing a shape using a mix according to this invention is as follows: a refractory batch is prepared having the materials makeup and preferred screen sizing discussed above. A mixture of from about 6 to 10% of a tempering fluid and about $\frac{1}{10}$ to $\frac{3}{10}$% of a dispersant, both by weight and based on the dry weight of the batch, is prepared. The tempering fluid-dispersant mixture is added to the batch, and the resulting mixture is flowed into a moisture-absorbent mold. An exemplary material for fabricating a mold is plaster of Paris. The resulting molded shape is allowed to dry. Preferably, the green shapes are then fired to about 2000° F. Such fired shapes exhibit the same microscopic characteristics as the other fired shapes of this invention.

Exemplary dispersants well known in the art are, for example, certain sodium phosphates. The commercial sodium phosphate, "Calgon," is a useful specific dispersant for the practice of the invention. An exemplary tempering fluid is water.

Having thus described the invention in detail and with sufficient particularity as to enable those skilled in the art to practice it, what is desired to have protected by letters patent is set forth in the following claims.

I claim:

1. A fired refractory conduit made from a refractory batch consisting of 45 to 75%, by weight, selected high alumina refractory material, said selected material analyzing at least about 50% $Al_2O_3$, by weight on an oxide analysis, about 10 to 30%, by weight, amorphous silica, said amorphous silica resting on a 65 mesh screen, the total high alumina refractory material and amorphous silica being from 75 to 85% of the batch, about 5 to 15%, by weight, minus 65 mesh ball clay plasticizer, the remainder being finely divided calcined alumina; 50 to 70% of the batch resting on a 65 mesh screen and 30 to 50% passing a 65 mesh screen, the fraction resting on a 65 mesh screen being from 25 to 35% minus 3 and resting on a 10 mesh screen, of that fraction passing 65 mesh at least 70% thereof passing a 150 mesh screen and a portion thereof passing 325 mesh, the portion passing 325 mesh containing at least a total of 10%; based on the total batch weight, of calcined alumina and ball clay, the calcined alumina and ball clay passing a 325 mesh screen being present in substantially equal quantities, said conduit characterized as having relatively coarse high alumina refractory material and amorphous silica loosely bonded in place by a mullite matrix having a network of tessellated cracks.

2. The fired refractory conduit of claim 1 which is fired to about 2000° F.

3. A refractory batch consisting of 45 to 75%, by weight, of selected high alumina refractory material, said selected material analyzing at least about 50% $Al_2O_3$, by weight of an oxide analysis, about 10 to 30%, by weight, amorphous silica, said amorphous silica resting on a 65 mesh screen, the total high alumina refractory material and amorphous silica being from 75 to 85% of the batch, about 5 to 15%, by weight, of minus 65 mesh ball clay plasticizer, the remainder being finely divided calcined alumina; 50 to 70% of the batch resting on a 65 mesh screen, and 30 to 50% passing 65 mesh, of the fraction resting on a 65 mesh screen, from 25 to 35% being minus 3 and resting on a 10 mesh screen, of that fraction passing 65 mesh, at least 70% thereof passing a 150 mesh screen and a portion thereof also passing 325 mesh, the portion passing 325 mesh containing at least a total of 10% based on the total batch weight of calcined alumina and ball clay, the calcined alumina and ball clay passing 325 mesh being present in substantially equal quantities.

4. That method of manufacturing a refractory shape which comprises the steps of preparing a refractory batch consisting of 45 to 75%, by weight, of a selected high alumina refractory material, said selected material analyzing at least about 50% $Al_2O_3$, by weight on an oxide analysis, about 10 to 30%, by weight, amorphous silica, said amorphous silica resting on a 65 mesh screen, the total high almumina refractory material and amorphous silica being from 75 to 85% of the batch, about 5 to 15%, by weight, of minus 65 mesh ball clay plasticizer, the remainder being finely divided calcined alumina; 50 to 70% of the batch resting on a 65 mesh screen and 30 to 50% passing 65 mesh, of the fraction resting on a 65 mesh screen, from 25 to 35% being 3 on 10 mesh, of that fraction passing 65 mesh at least 70% thereof passing a 150 mesh screen and a portion thereof also passing 325 mesh, the portion passing 325 mesh containing at least a total of 10%, based on the total batch weight, calcined alumina and ball clay in substantially equal quantities, preparing a mixture of about 6 to 10% of a tempering fluid and about 0.1 to 0.3% of a dispersant, both by weight and based on the total dry weight of the batch, adding the tempering fluid-dispersant mixture to the batch of refractory ingredients, preparing a moisture absorbent mold, flowing the wet batch into the mold, recovering a cast shape, drying the resultant shape, firing the dried shape, said shape characterized as having relatively coarse high alumina refractory material and amorphous silica loosely bonded in place by a mullite matrix having a network of tessellated cracks.

5. The method of claim 4 in which the shape is fired to about 2000° F.

References Cited by the Examiner
UNITED STATES PATENTS

| | | | |
|---|---|---|---|
| 2,569,430 | 9/1951 | Schroeder et al. | 106—65 |
| 3,067,050 | 12/1962 | Miller | 106—65 |
| 3,135,616 | 6/1964 | Norton | 106—65 |

TOBIAS E. LEVOW, *Primary Examiner.*

J. POER, *Assistant Examiner.*